United States Patent
Yamanaka et al.

(10) Patent No.: US 9,920,831 B2
(45) Date of Patent: Mar. 20, 2018

(54) INPUT DEVICE

(71) Applicant: Panasonic Intellectual Property Management Co., Ltd., Osaka (JP)

(72) Inventors: Seigo Yamanaka, Fukui (JP); Masamine Yasui, Fukui (JP); Masahiro Mizukami, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/422,521

(22) Filed: Feb. 2, 2017

(65) Prior Publication Data

US 2017/0261097 A1 Sep. 14, 2017

(30) Foreign Application Priority Data

Mar. 9, 2016 (JP) .................... 2016-046308

(51) Int. Cl.
| | |
|---|---|
| *F16H 59/08* | (2006.01) |
| *G05G 1/08* | (2006.01) |
| *G05G 5/03* | (2008.04) |
| *B60K 20/02* | (2006.01) |
| *G05G 5/02* | (2006.01) |
| *B60Q 9/00* | (2006.01) |
| *G05G 1/10* | (2006.01) |

(52) U.S. Cl.
CPC ............ *F16H 59/08* (2013.01); *B60K 20/02* (2013.01); *B60Q 9/00* (2013.01); *G05G 1/08* (2013.01); *G05G 1/10* (2013.01); *G05G 5/02* (2013.01); *G05G 5/03* (2013.01); *F16H 2059/081* (2013.01); *G05G 2505/00* (2013.01); *G05G 2700/12* (2013.01)

(58) Field of Classification Search
CPC ............... F16H 59/08; F16H 2059/081; F16H 2059/082; F16H 2059/086; G05G 1/08; G05G 1/10; G05G 5/02; G05G 5/03
See application file for complete search history.

(56) References Cited

U.S. PATENT DOCUMENTS

| | | | | |
|---|---|---|---|---|
| 2015/0159747 A1* | 6/2015 | Hoskins | .............. | F16H 59/0217 74/473.23 |
| 2015/0167827 A1* | 6/2015 | Fett | ......................... | F16H 59/08 74/473.3 |
| 2015/0251534 A1* | 9/2015 | Kim | ....................... | B60K 20/08 180/333 |

FOREIGN PATENT DOCUMENTS

JP        2012-086828         5/2012

\* cited by examiner

*Primary Examiner* — Edwin A Young
(74) *Attorney, Agent, or Firm* — Greenblum & Bernstein, P.L.C.

(57) ABSTRACT

A pattern of a rotational operation force is changed by a state of a device of an input object. An input device includes a knob, a rotation shaft body that rotates together with the knob, a rotation controller that is capable of changing a rotational operation force, a detector that detects a rotational position, a controller, and a storage that stores a plurality of patterns. The controller reads a pattern from the storage according to a pattern signal input from an outside and controls the rotation controller when the knob is operated to be rotated according to a rotational position detected by the detector and the read pattern.

8 Claims, 13 Drawing Sheets

High speed

Retraction

INPUT DEVICE

BACKGROUND

1. Technical Field

The present disclosure relates to an input device that is used, for example, in an electric apparatus, an operation of a vehicle, and the like, particularly, relates to an input device that can operate an electric apparatus, a vehicle, and the like by rotating a knob with a hand of a person.

2. Description of the Related Art

For example, in PTL 1 discloses a shift operating device in which a shift range changeover switch is provided in an input device including a knob that is manually rotated and a rotary encoder that detects a rotation angle of the knob, and a number of shift patterns are selected by operating the shift range changeover switch.

CITATION LIST

Patent Literature

PTL 1: Japanese Patent Unexamined Publication No. 2012-86828

SUMMARY

However, in the rotary shift operating device of the related art, an actuator is controlled so that a force required to rotate the rotation knob, for example, a force required to rotate a rotation knob from an N (neutral) range to a R (reverse) range is heavier than a force for rotating from the N range to a D (drive) range. However, since the forces required for rotating the rotation knob when the vehicle is stopped and runs are similar weights, a driver may erroneously rotate the rotation knob to a range that has not to be operated in a running state of the vehicle. In this case, there is a problem that a shift position that cannot be handled by a transmission provided in the vehicle may be selected.

The disclosure is made in view of the problem described above and an object of the disclosure is to provide an input device that changes a force for rotating a knob according to a state of a vehicle such as a vehicle speed.

In order to achieve the object described above, an input device of the disclosure includes a knob that is operated to be rotated by a hand of a person; a rotation shaft body that is connected to the knob and rotates together with the knob; a rotation controller that is capable of changing a rotational operation force around the rotation shaft body or prohibiting a rotational operation; a detector that detects a rotational position of the rotation shaft body; a controller that is electrically connected to the rotation controller and the detector; and a storage that stores a plurality of patterns of the rotational operation force and rotational operation prohibition. The controller reads one of the patterns from the storage according to a pattern signal input from an outside and controls the rotation controller according to the rotational position detected by the detector and the read pattern when the knob is operated to be rotated, and changing the rotational operation force.

According to the disclosure, it is possible to change a force that rotates the knob according to a state of a vehicle such as a vehicle speed, to attract an operator's attention due to a difference in the rotational operation force, and to prevent an erroneous operation.

DETAILED DESCRIPTION

Hereinafter, exemplary embodiments of the disclosure will be described in detail with reference to the drawings as appropriate. However, detailed explanation may be omitted more than necessary. For example, a detailed explanation of already well-known matters and a duplicate description on substantially the same configuration may be omitted. This is to avoid to make the following explanation unnecessarily redundant and to facilitate understanding by those skilled in the art.

Moreover, the inventors provide the annexed drawings and the following description so that those skilled in the art can sufficiently understand the disclosure and it is not intended to limit the subject described in the claims thereby.

The drawings are schematic figures in which emphasis, omission, and ratio adjustment are appropriately made in order to illustrate the disclosure and which may differ from actual shapes, positional relationships, and ratios.

Exemplary Embodiment 1

Figure 1:
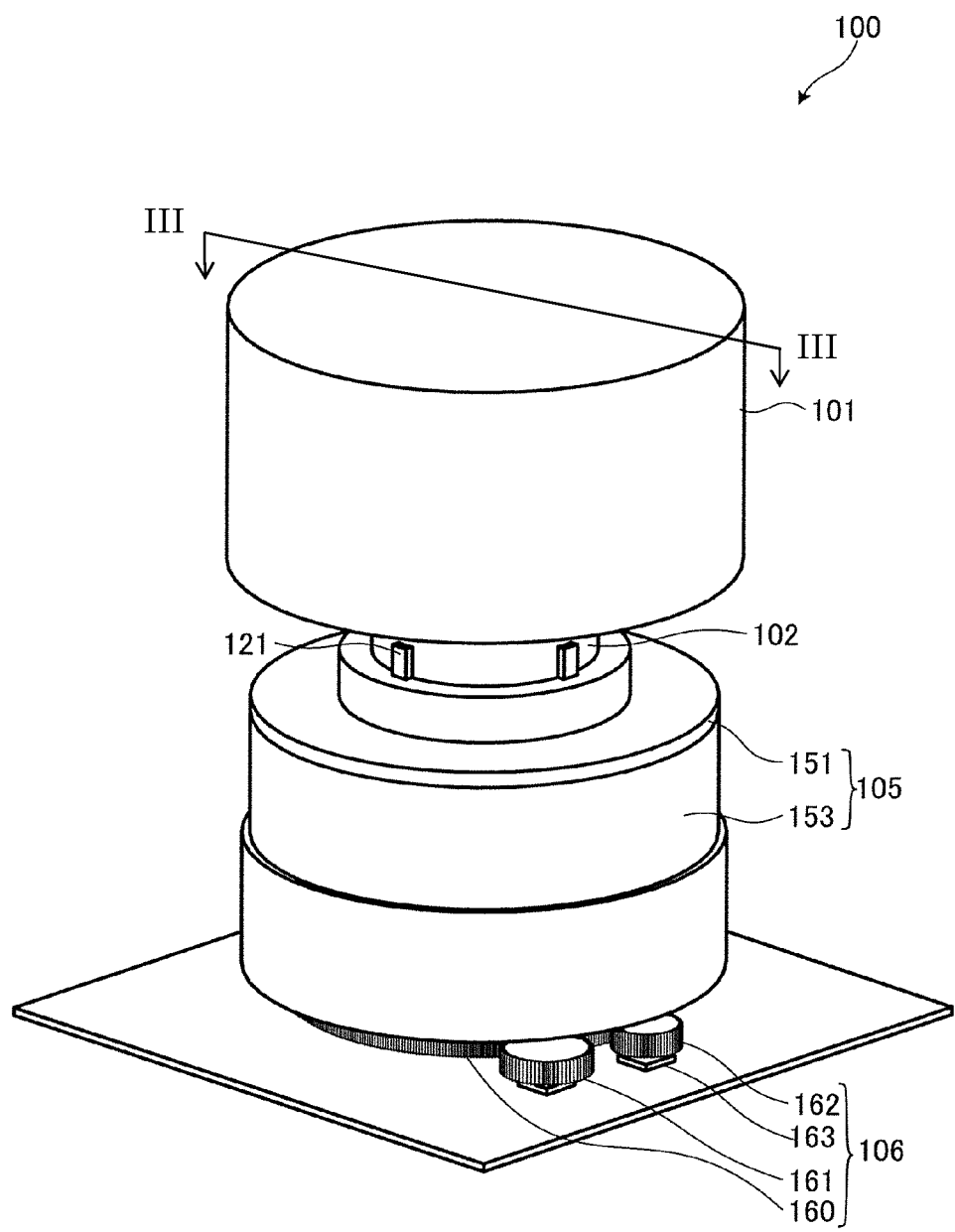
FIG. 1 is a perspective view illustrating an input device according to Exemplary Embodiment 1.

FIG. 1 is a perspective view illustrating an input device according to Exemplary Embodiment 1.

Figure 2:
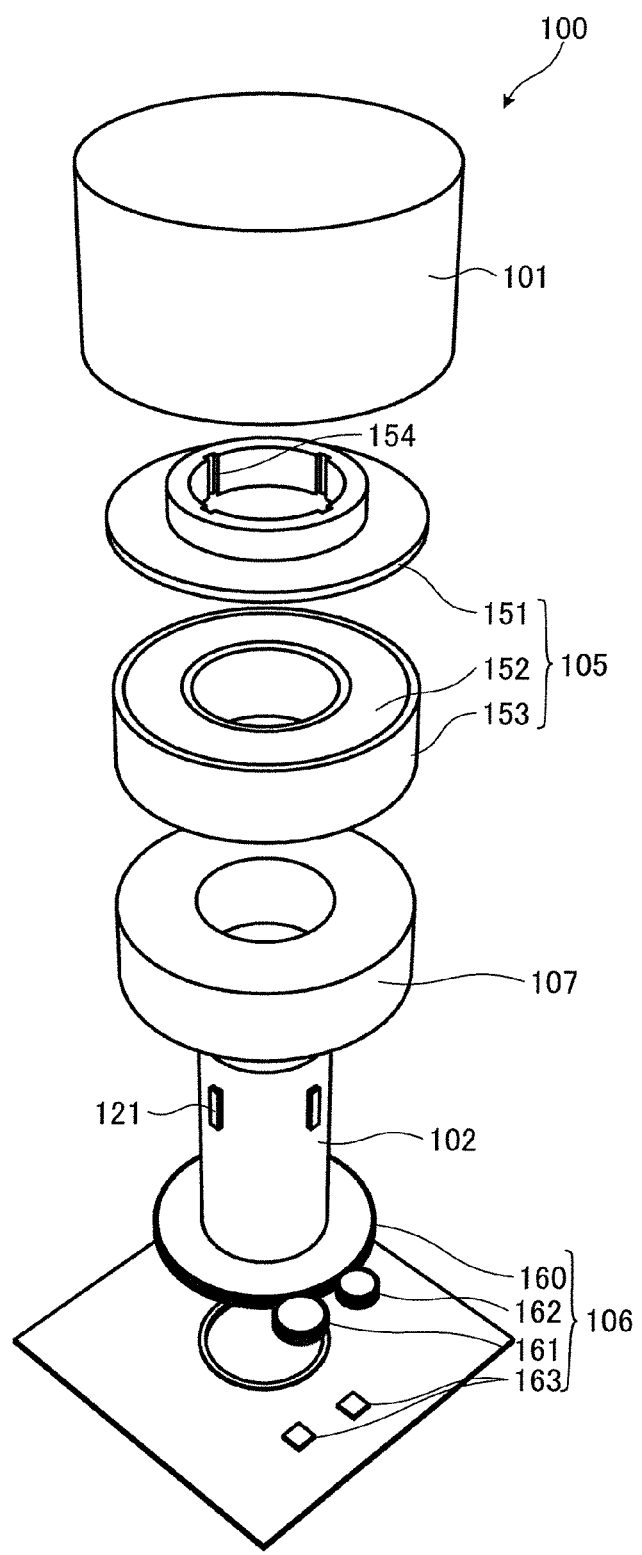
FIG. 2 is a perspective view illustrating a state where the input device according to Exemplary Embodiment 1 is exploded.

FIG. 2 is a perspective view illustrating a state where the input device according to Exemplary Embodiment 1 is exploded.

Figure 3:
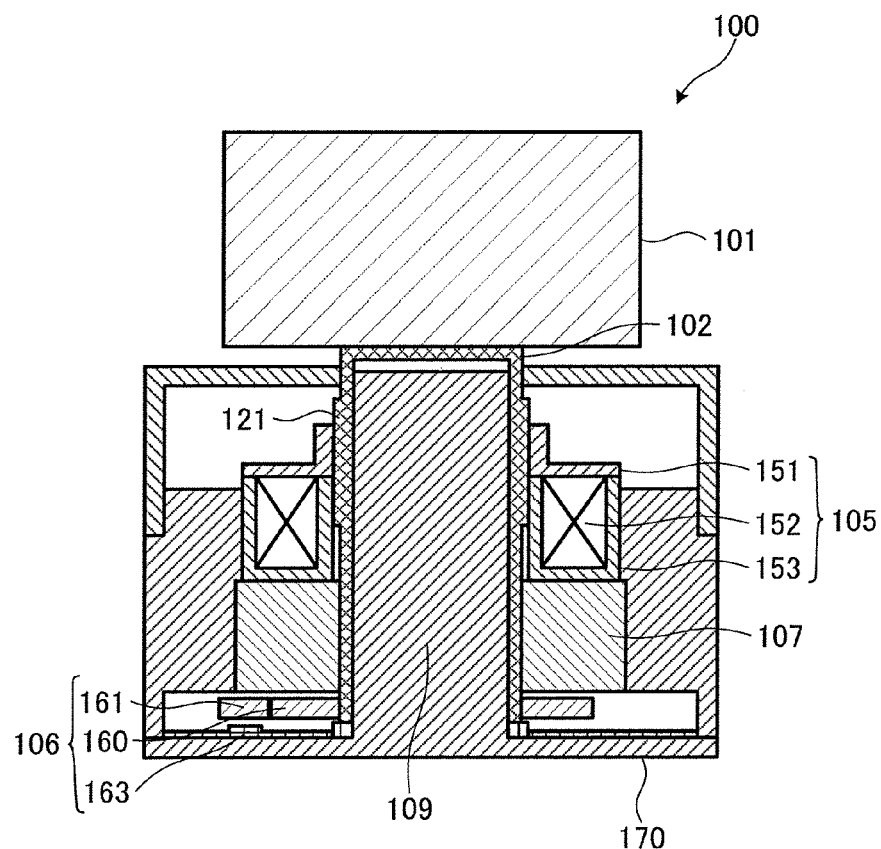
FIG. 3 is a sectional view illustrating the input device together with a housing according to Exemplary Embodiment 1.

FIG. 3 is a sectional view that is taken along line III-III illustrating the input device together with a housing according to Exemplary Embodiment 1.

Figure 4:
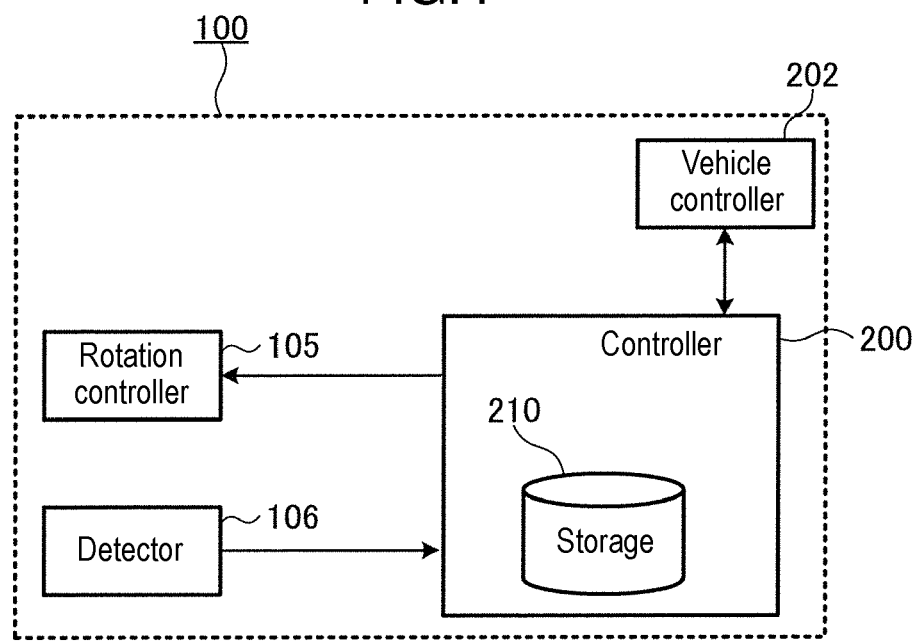
FIG. 4 is a block diagram illustrating functional units together with mechanism units of the input device according to Exemplary Embodiment 1.

FIG. 4 is a block diagram illustrating functional units together with mechanism units of the input device according to Exemplary Embodiment 1.

As illustrated in the drawings, input device 100 is a device that can input a signal corresponding to a rotational operation by a hand of a person to an electric apparatus or another apparatus such as a vehicle, and includes knob 101, rotation shaft body 102, rotation controller 105, and detector 106 as mechanism units, and includes storage 210 and controller 200 as functional units. In a case of the exemplary embodiment, input device 100 includes operation force imparting unit 107, fixed shaft body 109 (see FIG. 3), and housing 170 (see FIG. 3).

Knob 101 is a member that is operated to be rotated by being pinched by a hand of a person. In a case of the exemplary embodiment, knob 101 has a cylindrical shape and a diameter and a height are equal to each other, or the height is shorter than the diameter. A knurled pattern (not illustrated) is engraved on an outer peripheral surface of knob 101 and the finger is prevented from being slipped when knob 101 is operated to be rotated.

Figure 9:
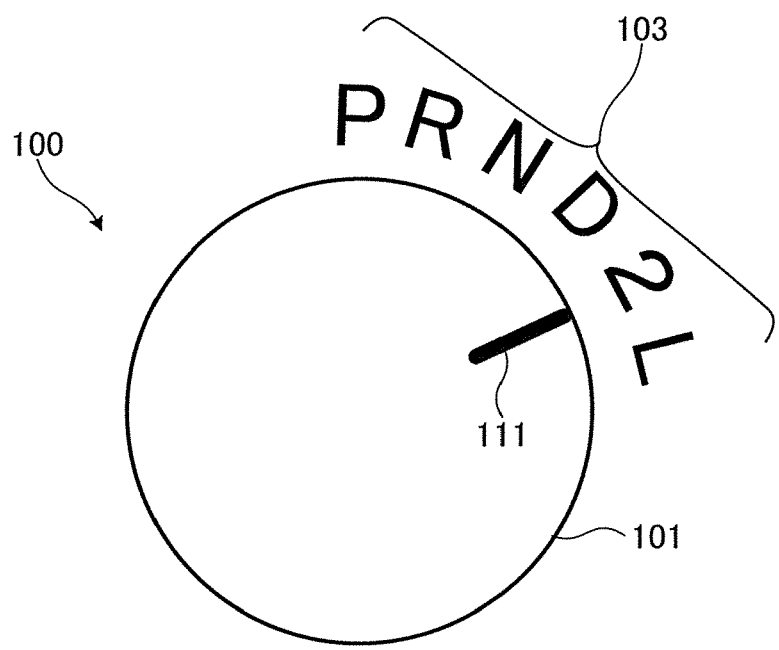
FIG. 9 is a plan view illustrating a state where the input device according to Exemplary Embodiment 1 is mounted on a vehicle.

As illustrated in FIG. 9, mark 111 indicating a selection position is provided on a surface of knob 101 and display 103 is positioned at a position corresponding to the rotational operation of the knob.

A material of knob 101 is selected from any material such as metal and resin. An external shape of knob 101 is not limited to the cylindrical shape and is adopted in any shape such as a star shape.

Display 103 may be provided on a surface of a member on which input device 100 is mounted instead of input device 100.

Rotation shaft body 102 is a rod-like member that is connected to knob 101 and rotates together with knob 101 that is operated to be rotated by a hand of a person. In a case of the exemplary embodiment, rotation shaft body 102 is disposed coaxially with knob 101 and is held to be capable of mounting and demounting knob 101. As illustrated in FIG. 3, rotation shaft body 102 has a cylindrical shape fitted coaxially to fixed shaft body 109 erected on housing 170 and can rotate around fixed shaft body 109. First protrusions 121 that extend in an axial direction of rotation shaft body 102 and protrude in a radial direction are equally spaced at four locations on a circumference in an outer peripheral surface of rotation shaft body 102.

Although a material configuring rotation shaft body 102 is not particularly limited, in a case where rotation controller 105, detector 106, operation force imparting unit 107 described below function using a magnetic force, a non-magnetic material is preferable. For example, rotation shaft body 102 may be formed of resin.

Rotation controller 105 is a device that can allow and prohibit the rotation of knob 101 around rotation shaft body 102, and is a device that can change a rotational operation force around rotation shaft body 102. In a case of the exemplary embodiment, as illustrated in FIGS. 2 and 3, rotation controller 105 includes armature 151, electromagnet 152, and yoke 153, and functions as an electromagnetic brake that prohibits the rotation of rotation shaft body 102 by strongly joining yoke 153 and armature 151 by an electromagnetic force. Rotation controller 105 adjusts an electromagnetic force that is generated by adjusting an electric power supplied to electromagnet 152 and can change (adjust) the rotational operation force when armature 151 rotates with respect to yoke 153.

Armature 151 is a member that is fixed to rotation shaft body 102 on the side of the outer peripheral surface of rotation shaft body 102.

In a case of the exemplary embodiment, armature 151 is annular and grooves 154 fitting to first protrusions 121 that are provided in rotation shaft body 102 are equally spaced at four locations on a circumference on an inner peripheral surface. A width of groove 154 is equal to a width of first protrusion 121 in the circumferential direction of rotation shaft body 102 and is fitted to first protrusion 121 in a state where there is substantially no play with first protrusion 121. Groove 154 smoothly slides with first protrusion 121 in the axial direction of rotation shaft body 102 and even in a case where rotation shaft body 102 moves in the axial direction, a relative position of armature 151 does not fluctuate.

A material configuring armature 151 is a magnetic material. When electric power equal to or greater than an upper limit threshold is supplied to electromagnet 152, armature 151 is fixed to yoke 153 and when electric power (including power off) equal to or less than a lower limit threshold is supplied, fixation is released. It is possible to rotate armature 151 with respect to yoke 153 with a predetermined rotation torque by supplying electric power between the upper limit threshold and the lower limit threshold. Specifically, as the material configuring armature 151, iron can be exemplified.

In a case where grooves extending in recessed axial direction are provided in rotation shaft body 102 in the radial direction, similar protrusions may be provided in armature 151.

Electromagnet 152 is a coil made of a conductive wire disposed on the side of the outer peripheral surface of rotation shaft body 102. Electromagnet 152 can change the magnetic force generated corresponding to electric power supplied from the outside. In a case of the exemplary embodiment, electromagnet 152 is formed in an annular shape wrapped around rotation shaft body 102 and is disposed in a state of being housed in yoke 153.

Yoke 153 is a member that is disposed on the side of the outer peripheral surface of rotation shaft body 102, controls a magnetic flux that is generated based on electromagnet 152, strongly magnetically attracts armature 151, and generates friction with armature 151. Therefore, rotation of armature 151 around rotation shaft body 102 is prohibited and a rotational torque of armature 151 can be adjusted. When the magnetic flux from electromagnet 152 runs out, yoke 153 has no force to attract armature 151 and the friction with armature 151 is reduced. Therefore, the rotation of armature 151 around rotation shaft body 102 is allowed.

A shape of yoke 153 is not particularly limited, but in a case of the exemplary embodiment, it is a ring shape and a container-like shape which can house electromagnet 152. A material configuring yoke 153 is a magnetic material which can control the magnetic flux generated by electromagnet 152. Specifically, as the material configuring yoke 153, iron can be exemplified.

Detector 106 is a device that detects a rotation state of rotation shaft body 102. The rotation state is, for example, a rotation position and a rotation angle of rotation shaft body 102, and the like. In a case of the exemplary embodiment, detector 106 includes main gear 160, first gear 161, second gear 162, and detection element 163, and detects rotation positions of rotation shaft body 102 and knob 101.

Main gear 160 is a spur gear coaxially mounted on rotation shaft body 102 and is a gear that is rotated together with rotation shaft body 102. First gear 161 and second gear 162 are spur gears having mutually different diameters that mesh with main gear 160.

A magnet for detecting rotation by detection element 163 is mounted on each of first gear 161 and second gear 162.

Detection element 163 is an element that detects the rotations of first gear 161 and second gear 162. In a case of the exemplary embodiment, detection element 163 includes a magnetoresistive element that individually detects the movements of the magnets which are respectively provided in first gear 161 and second gear 162.

Detector 106 respectively detects the rotations of first gear 161 and second gear 162 having different diameters each other, which mesh with main gear 160 respectively, using two detection elements 163. Therefore, not only a relative rotation state of rotation shaft body 102 but also an absolute rotation state, that is, the rotational position of rotation shaft body 102 with respect to housing 170 can be detected via main gear 160.

Detector 106 is not limited to the above description and any detector such as a rotary encoder may be used.

Operation force imparting unit 107 is a device that generates a feeling of operation for each predetermined angle of knob 101. In a case of the exemplary embodiment, operation force imparting unit 107 is a moderation device that can notify the hand of a person that knob 101 is at a predetermined rotational position via rotation shaft body 102 as an operational feeling (force sense). Operation force imparting unit 107 can transmit a moderation feeling (click feeling) which is, for example, a feeling such as a state where a pin biased toward a notch is suitably fitted in notch and where the pin is detached from the notch, to the hand of a person who rotates knob 101. Operation force imparting unit 107 may be one capable of generating the moderation feeling using magnetism, that is, one capable of controlling change in the moderation feeling, disappearance of the moderation feeling, or the like.

Housing 170 is a member that is fixed to another apparatus such as an electric apparatus and a vehicle, and serves as a positional reference for the rotation of knob 101, or push and pull of knob 101. Housing 170 holds yoke 153 that is a part of rotation controller 105 in a fixed state and holds a part of operation force imparting unit 107 in a fixed state. Detection element 163 is attached and first gear 161 and second gear 162 are rotatably attached to housing 170.

In a case of the exemplary embodiment, housing 170 houses members other than knob 101 and an distal end portion of rotation shaft body 102.

Next, the functional units of input device 100 will be described.

As illustrated in FIG. 4, storage 210 is a processing unit in which the plurality of patterns of the rotational operation force and rotational operation prohibition are stored. Here, as illustrated in FIGS. 5 to 8, the pattern is information that defines the rotational operation force for each rotational position when the rotational operation is performed from a certain rotational position to an adjacent rotational position.

In a case of the exemplary embodiment, input device 100 is attached to a vehicle and the rotational position of knob 101 corresponds to the shift position of a vehicle. That is, the patterns stored in storage 210 correspond to the shift patterns of the transmission mounted on a vehicle. For example, a plurality of kinds as illustrated in FIGS. 5, 6, 7, and 8 are present in the patterns stored in storage 210. The meaning of the patterns indicated in the drawings will be described later.

Specifically, storage 210 is a storage device such as a Random Access Memory (RAM), a Read Only Memory (ROM), or a hard disk which also stores temporary data and the like used in the processing of controller 200.

Controller 200 is a device that is electrically connected to rotation controller 105 and detector 106, and controls rotation controller 105 based on information from detector 106, and is a computer that can realize each processing unit by executing a program.

In a case of the exemplary embodiment, controller 200 reads one pattern from the plurality of patterns stored in storage 210 according to a pattern signal input from the outside of input device 100 via vehicle controller 202. Controller 200 controls rotation controller 105 when knob 101 is operated to be rotated according to the rotational position of knob 101 detected by detector 106 and a pattern that is read. The pattern signal is a vehicle speed signal that is obtained from a vehicle on which input device 100 mounted via vehicle controller 202. That is, rotation controller 105 is controlled with a pattern corresponding to the vehicle speed.

Vehicle controller 202 obtains a running state of a vehicle, particularly, information regarding the vehicle speed of a vehicle from the vehicle, and outputs the information to controller 200. Controller 200 converts the rotational position, that is, the rotational position of knob 101 that is detected by detector 106 into the corresponding gear position in the transmission and outputs the rotational position to vehicle controller 202. Vehicle controller 202 outputs the gear position received from controller 200 to the mounted transmission of a vehicle. Therefore, the vehicle can switch the transmission to the gear position corresponding to the intension of a driver who operates input device 100.

Next, an operation of input device 100 according to the exemplary embodiment will be described in a case where input device 100 is attached to a vehicle as an example.

FIG. 9 is a plan view illustrating a state where input device 100 according to the exemplary embodiment is mounted on a vehicle.

Figure 10:
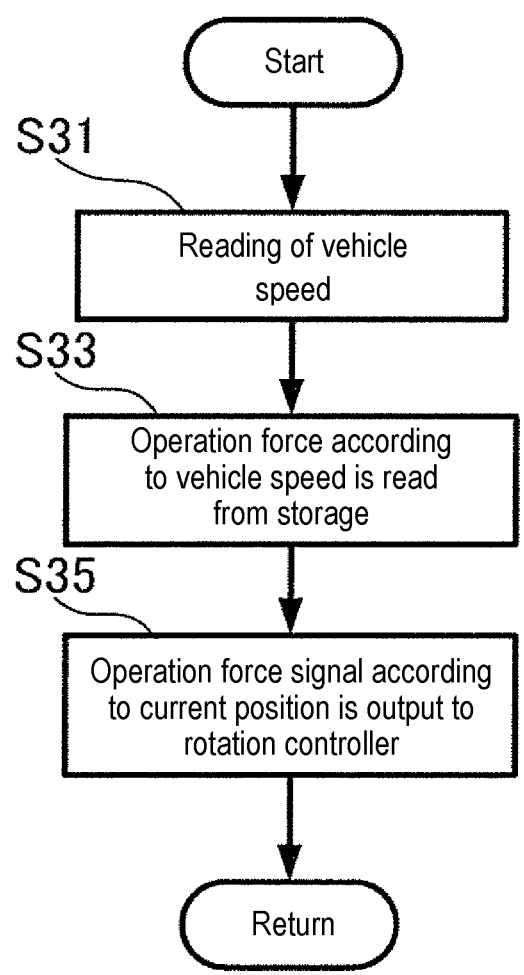
FIG. 10 is a flowchart illustrating a flow of processing of the input device according to Exemplary Embodiment 1.

FIG. 10 is a flowchart illustrating a flow of processing of input device 100 according to the exemplary embodiment.

Input device 100 is attached to a vehicle for changing an operation state of a vehicle (not illustrated), particularly, the gear position. P, R, N, D, 2, and L indicated in FIG. 9 correspond to gear positions of a transmission that are defined in a vehicle in advance. P is parking (state where tires are locked), R is reverse (retracted state), N is neutral (state where the tires are not locked), D is a drive (normal running state), 2 is second (state between drive and low), and L is low (state engine brake is required).

Controller 200 of input device 100 frequently performs reading of the vehicle speed via vehicle controller 202 (S31) and always grasps the rotational position of knob 101 that is detected by detector 106.

Figure 5:
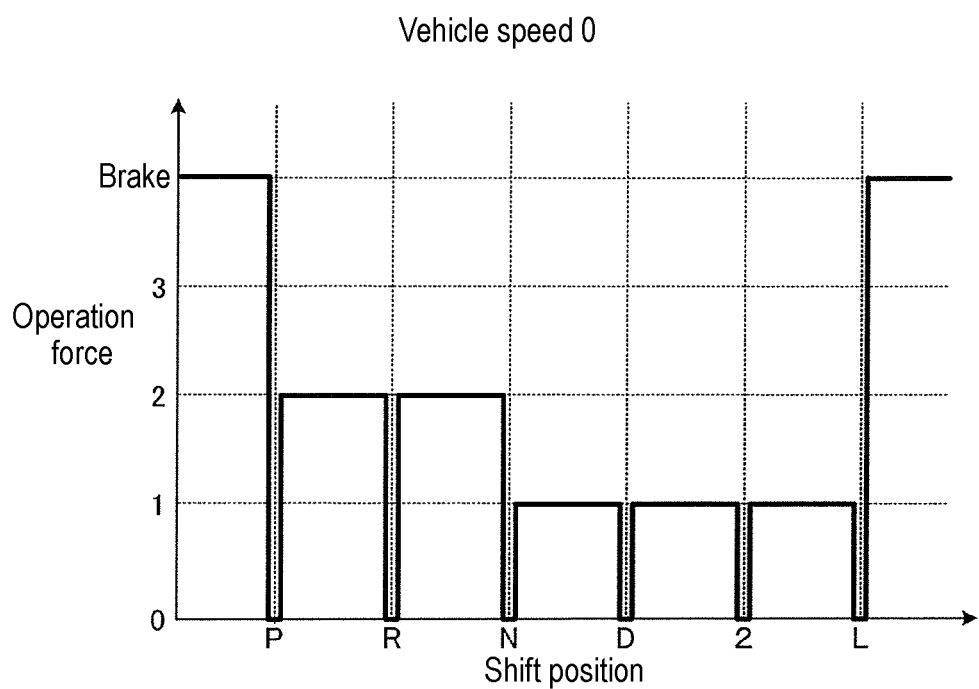
FIG. 5 is a diagram illustrating one of patterns stored in a storage.

For example, in a state where a vehicle is stopped, that is, in a state where the vehicle speed is 0, controller 200 reads the pattern illustrated in FIG. 5 from storage 210 (S33). Mark 111 of knob 101 indicates the position of P.

A driver tries to start the vehicle by rotating knob 101. In this case, when knob 101 is rotated to the left, controller 200 controls rotation controller 105 (S35) and prohibits the rotation of knob 101 so as to obtain the operation force corresponding to the current position. On the other hand, when knob 101 is rotated to the right, controller 200 controls rotation controller 105 so that it can rotate to the positions of R and N by an operation force of step 2. On the other hand, controller 200 controls rotation controller 105 so that the operation force in a case of rotating from the position of N to the right becomes stage 1.

As described above, when the vehicle speed is 0, the operation to all positions becomes possible. However, particularly, when changing to the R position, setting the rotational operation force to a higher value can draw attention to the driver and the vehicle is prevented from being backed wrongly.

Figure 6:
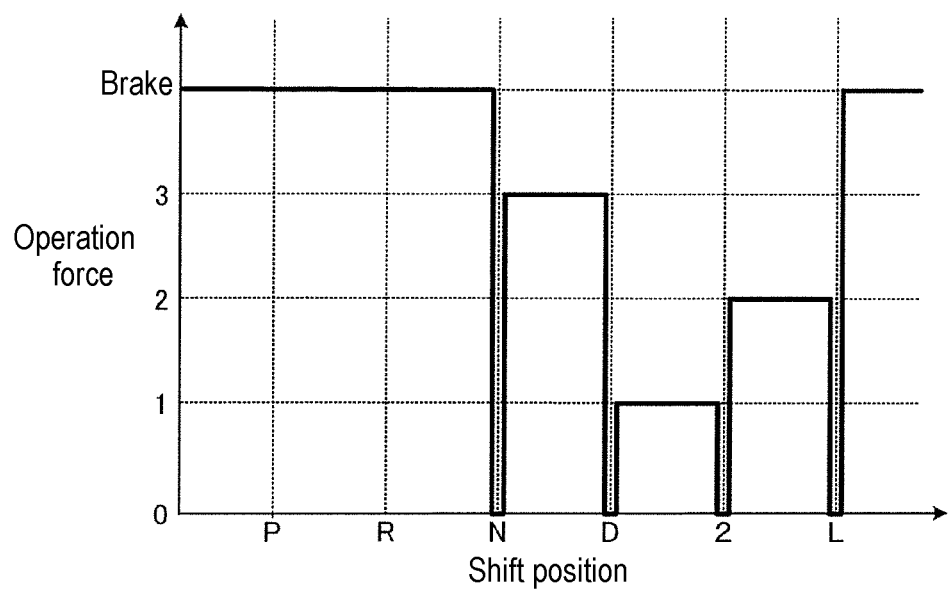
FIG. 6 is a diagram illustrating another of the patterns stored in the storage.

When the vehicle runs at a low speed, as illustrated in FIG. 6, rotation controller 105 is controlled so that the rotational operation force from D to N becomes stage 3. This is to reduce a possibility of blowing up the engine and to prevent the engine brake from becoming ineffective on downward slopes or the like. Since the rotation from 2 to L has a possibility of blowing up the engine, the rotational operation force is set to the state 2. Since the vehicle runs forward, in order to prohibit the operation to R, controller 200 prohibits the rotation of knob 101 from the position of N to the left.

Figure 7:
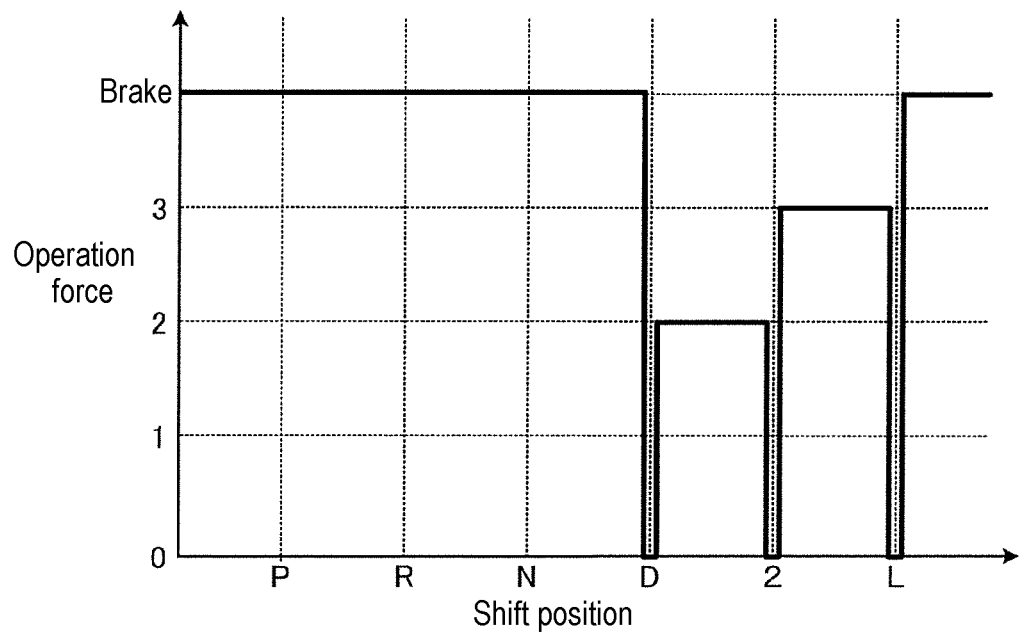
FIG. 7 is a diagram illustrating still another of the patterns stored in the storage.
Figure 8:
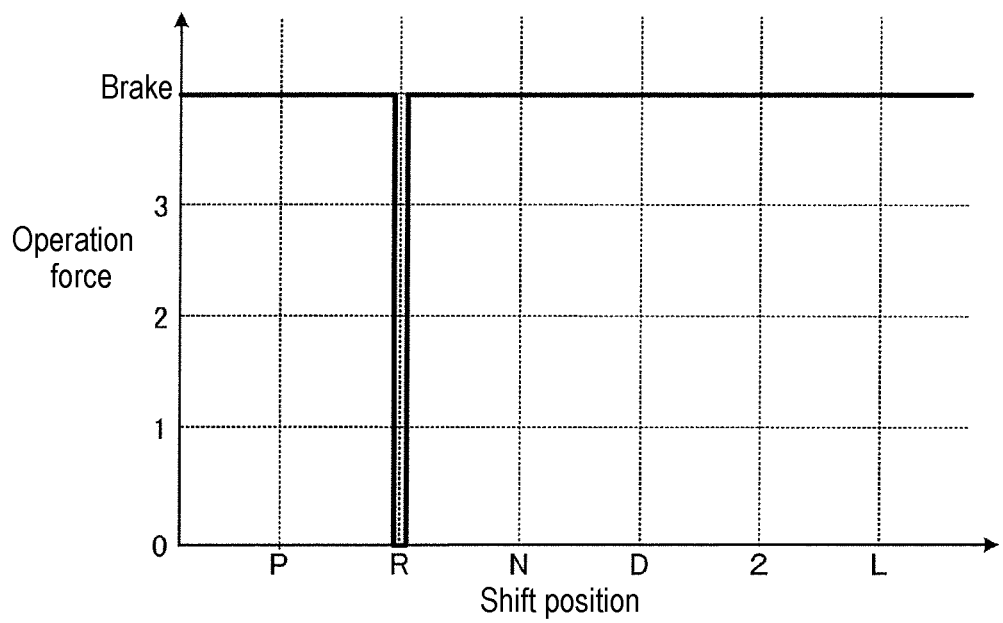
FIG. 8 is a diagram illustrating still another of the patterns stored in the storage.

During high speed running, as illustrated in FIG. 7, the rotational operation from D to N is also prohibited. This is to prevent the engine from being blown up. During retraction, as illustrated in FIG. 8, the rotation of knob 101 from the position of R to any direction is prohibited. Therefore, damage of the transmission due to the rotation of the vehicle to D during retraction or the like is prevented.

According to input device 100 as described above, in an operation to a shift position where the transmission cannot be handled by the driver, the operation force becomes heavier or the brake is applied. Therefore, it is possible to reduce the possibility that the shift position is erroneously selected and it is possible to improve safety and protect the transmission and the engine.

Exemplary Embodiment 2

Subsequently, another exemplary embodiment of input device 100 will be described. The same reference numerals are given to portions (parts) having the same operation, or function, and the same shape, mechanism, or function as that of Exemplary Embodiment 1 and the description may be omitted. In the following description, differences from Exemplary Embodiment 1 will be mainly described and explanations of the same contents may be omitted.

Storage 210 stores the number of positions in the rotational operation of knob 101 in addition to the patterns. The positions are the rotational positions sensed by an operator when the rotation of knob 101 is in a stably stopped state by operation force imparting unit 107.

For example, as illustrated in FIG. 9, the number of positions is 6 if the gear position of a vehicle to which input device 100 is attached is 6-stage.

Next, an operation of input device 100 according to the exemplary embodiment will be described.

Figure 11:
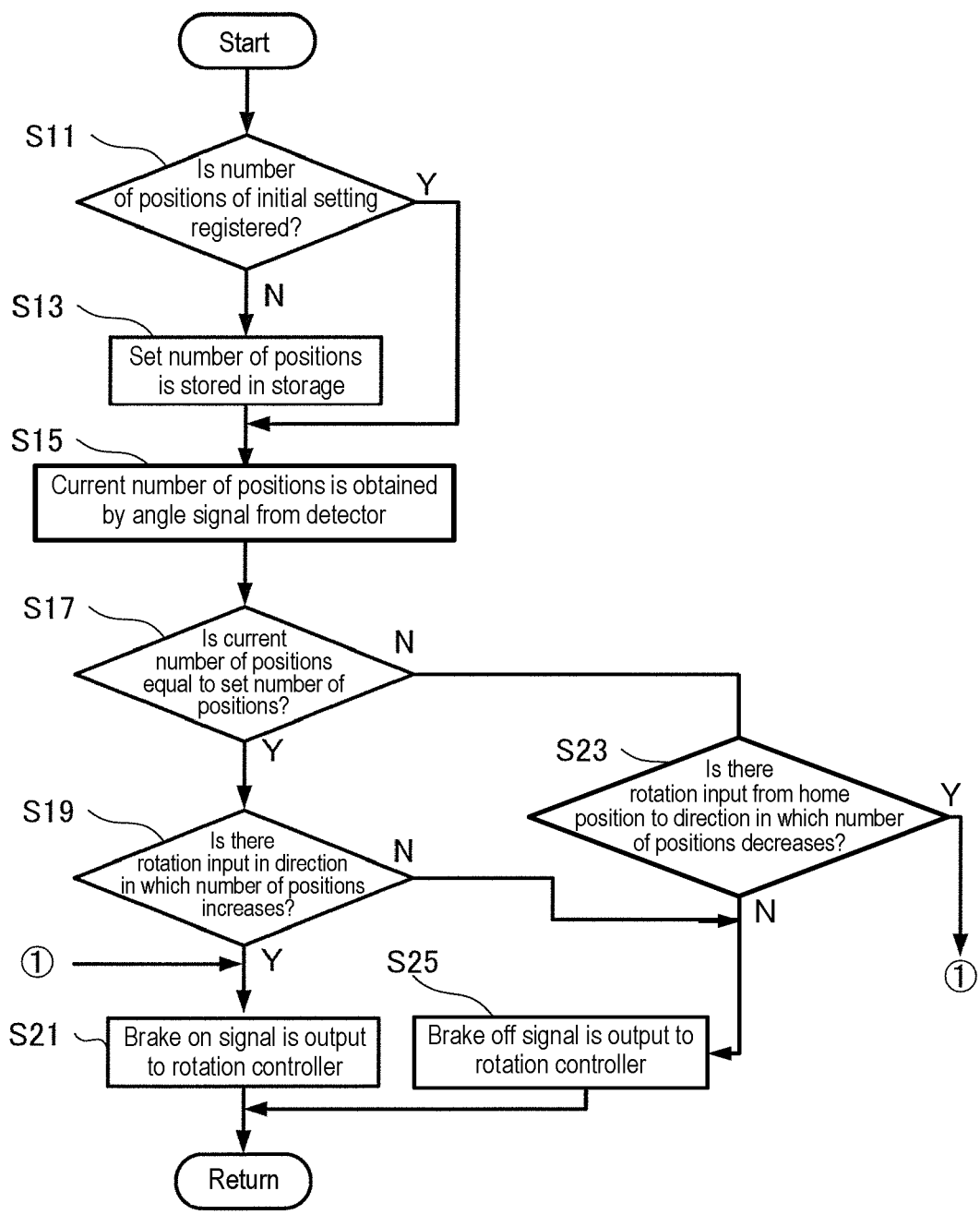
FIG. 11 is a flowchart illustrating a flow of processing of an input device according to Exemplary Embodiment 2.

FIG. 11 is a flowchart illustrating a flow of processing of the input device according to Exemplary Embodiment 2. First, it is confirmed whether the number of positions is registered in storage 210 as an initial setting (S11), if there is no registration (S11: N), the maximum number of the positions is registered in storage 210 as the number of setting positions (S13).

Normally, when driving a vehicle using input device 100, a driver rotates knob 101 to select a driving state. Mark 111 indicating the selected position is engraved on knob 101. Operation force imparting unit 107 controls a torque of rotation shaft body 102 so that a strong force sense is generated when mark 111 moves to be rotated from each position of P, R, N, D, 2, and L to an adjacent position. Detector 106 transmits an angle signal that is information indicating whether mark 111 is in any position of P, R, N, D, 2, and L, to controller 200, and controller 200 obtains the current number of the positions (S15).

When mark 111 is in the position of L, that is, if the current number of the positions is in the set number of the positions of "6" (S17: Y), and when there is a rotation input in a direction in which the number of the positions increases (S19: Y), controller 200 outputs a brake ON signal to rotation controller 105 according to a pattern stored in storage 210 (S21).

On the other hand, if the current number of the positions is in the set number of the positions of "6" (S17: Y), and if there is no rotation input in the direction in which the number of the positions increases (S19: N), controller 200 outputs a brake OFF signal to rotation controller 105 (S25).

If the current number of the positions is not in the set number of the positions of "6" (S17: N), and when there is a rotation input in a direction in which mark 111 rotates from a home position that is the position of P to a direction in which the number of the positions decreases (S23: Y), controller 200 outputs the brake ON signal to rotation controller 105 according to a pattern (S21). On the other hand, there is no rotation input from the home position to a direction in which the number of the positions decreases (S23: N), controller 200 outputs the brake OFF signal to rotation controller 105 (S25).

As described above, input device 100 can be rotated only in a range of the set number of the positions.

Figure 12:
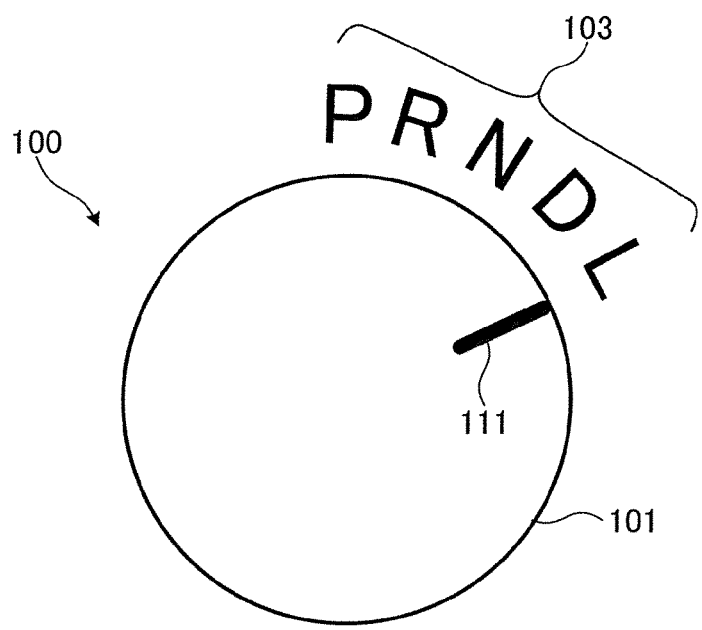
FIG. 12 is a plan view illustrating a state where the input device according to Exemplary Embodiment 2 is mounted on a vehicle.
Figure 13:
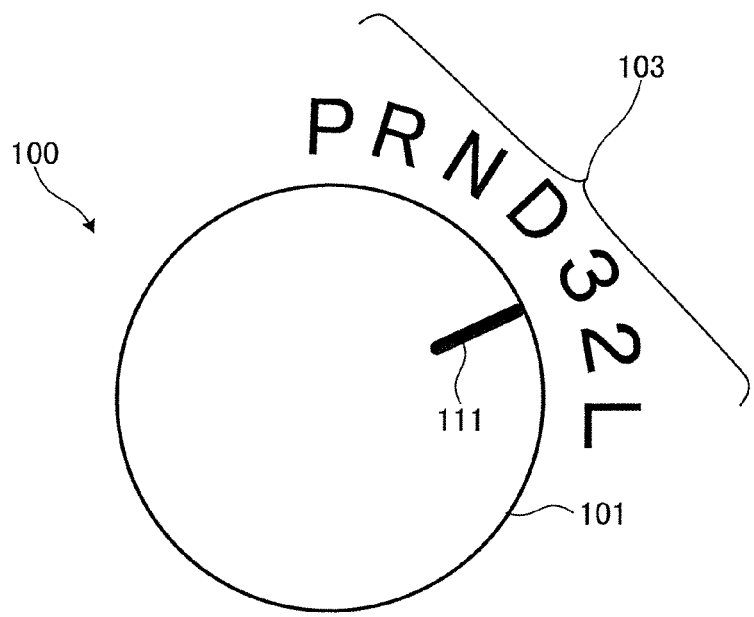
FIG. 13 is a plan view illustrating a state where the input device according to Exemplary Embodiment 2 is mounted on another type vehicle.
Figure 14:
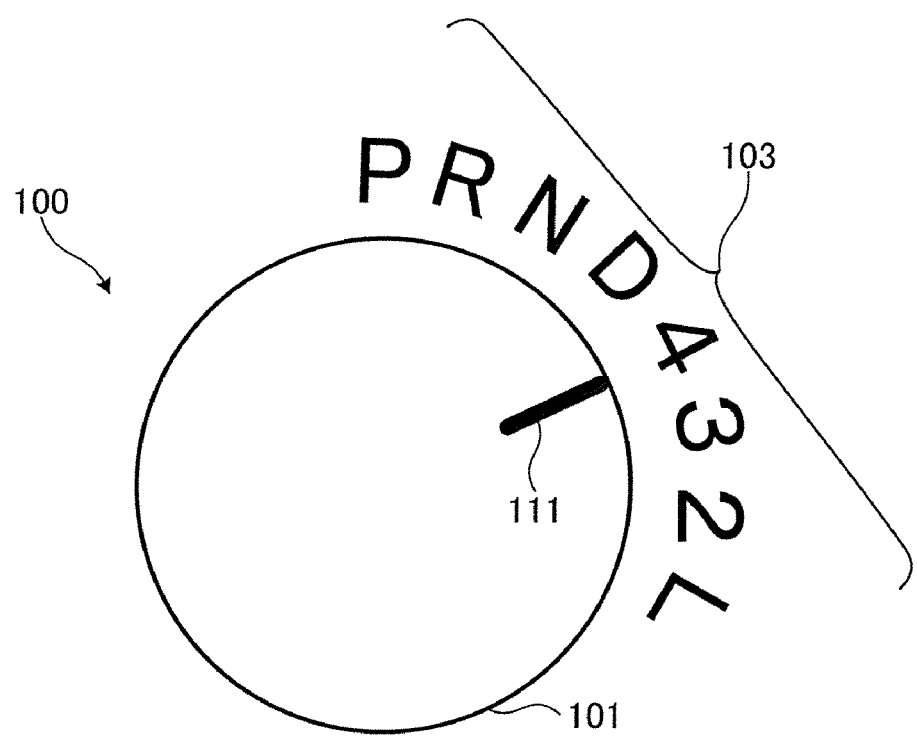
FIG. 14 is a plan view illustrating a state where the input device according to Exemplary Embodiment 2 is mounted on still another type vehicle.

According to input device 100 as described above, as illustrated in FIGS. 12, 13, and 14, even in a case where input device 100 is attached to a vehicle having different gear positions, it is possible to flexibly response to the type of the vehicle by changing the maximum number of the positions stored in storage 210.

Exemplary Embodiment 3

Subsequently, still another exemplary embodiment of input device 100 will be described. The same reference numerals are given to portions (parts) having the same operation, or function, and the same shape, mechanism, or function as that of Exemplary Embodiments 1 and 2, and the description may be omitted. In the following description, differences from Exemplary Embodiments 1 and 2 will be mainly described and explanations of the same contents may be omitted.

Figure 15:
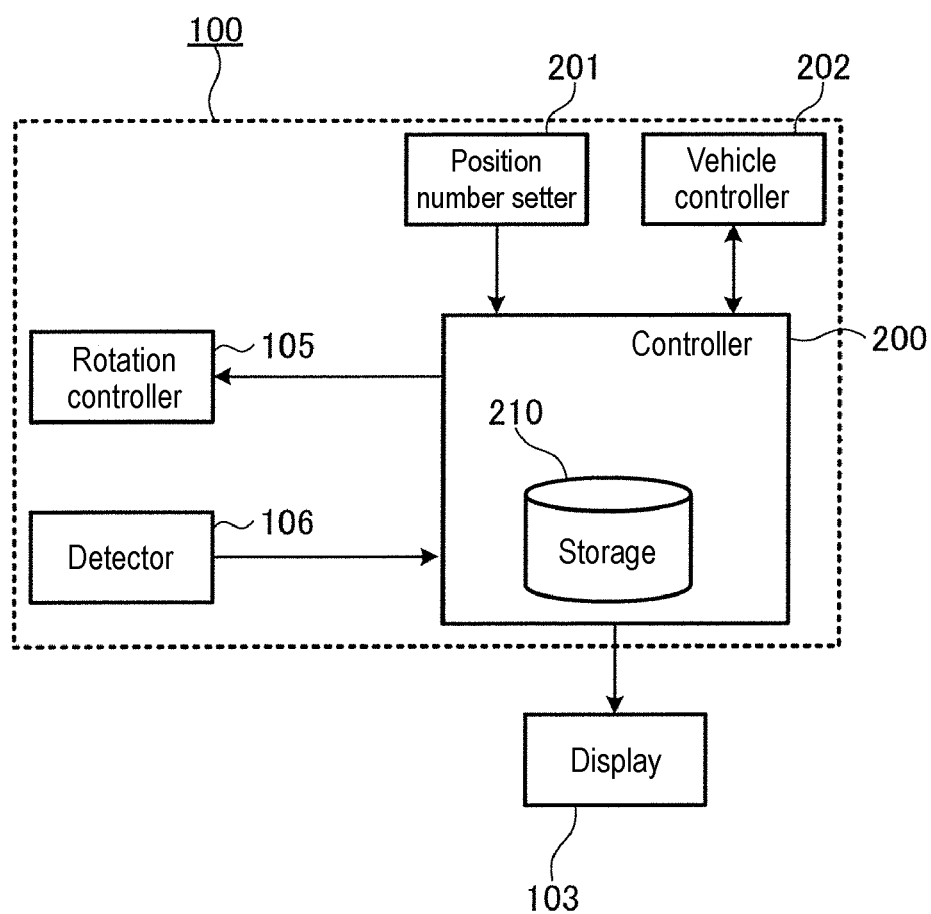
FIG. 15 is a block diagram illustrating functional units together with mechanism units of an input device according to Exemplary Embodiment 3.

FIG. 15 is a block diagram illustrating functional units together with mechanism units of an input device according to Exemplary Embodiment 3.

As illustrated in FIG. 15, input device 100 according to the exemplary embodiment further includes position number setter 201 and vehicle controller 202.

Position number setter 201 is a device that is connected to controller 200 and outputs a position number signal corresponding to the number of the positions that is set by a driver or the like to controller 200. Specifically, position number setter 201, for example, includes a user interface such as a touch panel or a switch, and outputs the position number signal according to the number of the positions that is input using the user interface.

Figure 16:
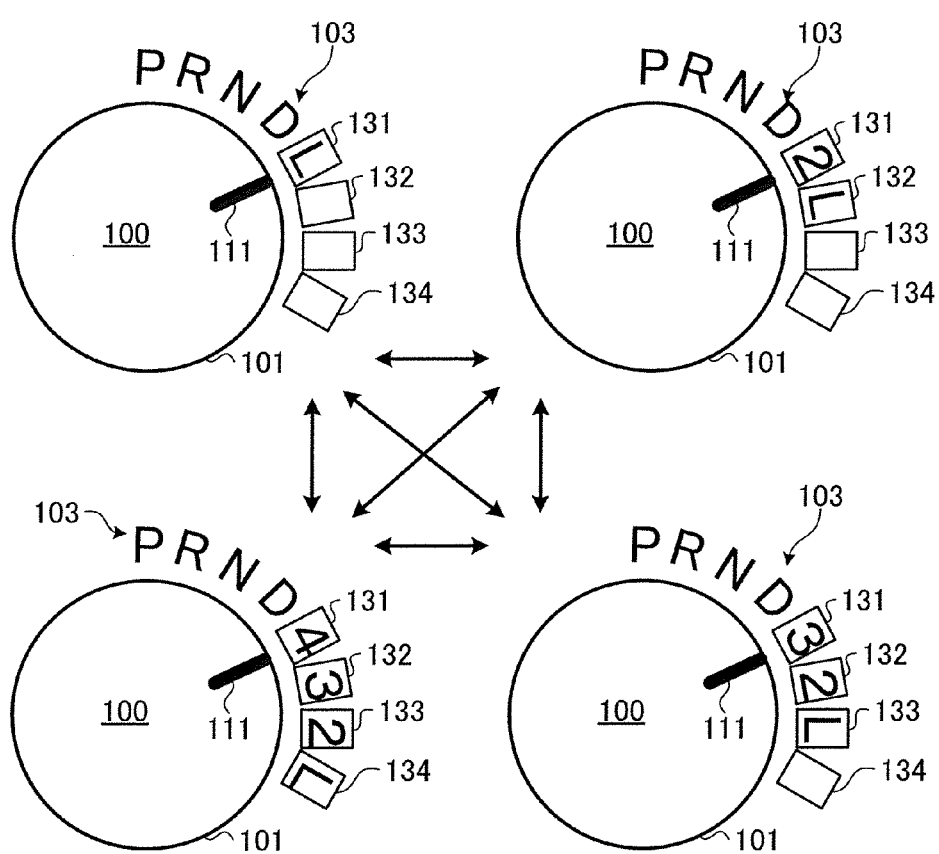
FIG. 16 is a plan view illustrating a state where the input device and a display according to Exemplary Embodiment 3 are mounted on a vehicle.

As illustrated in FIG. 16, display 103 includes a variable display that is electrically connected to not only fixed display 103 (P, R, N, and D) but also to controller 200, is disposed in a position corresponding to the position of knob 101, and is capable of changing display contents. In a case of the exemplary embodiment, the variable display includes from first variable display 131 to fourth variable display 134.

Next, an operation of input device 100 according to the exemplary embodiment will be described.

Figure 17:
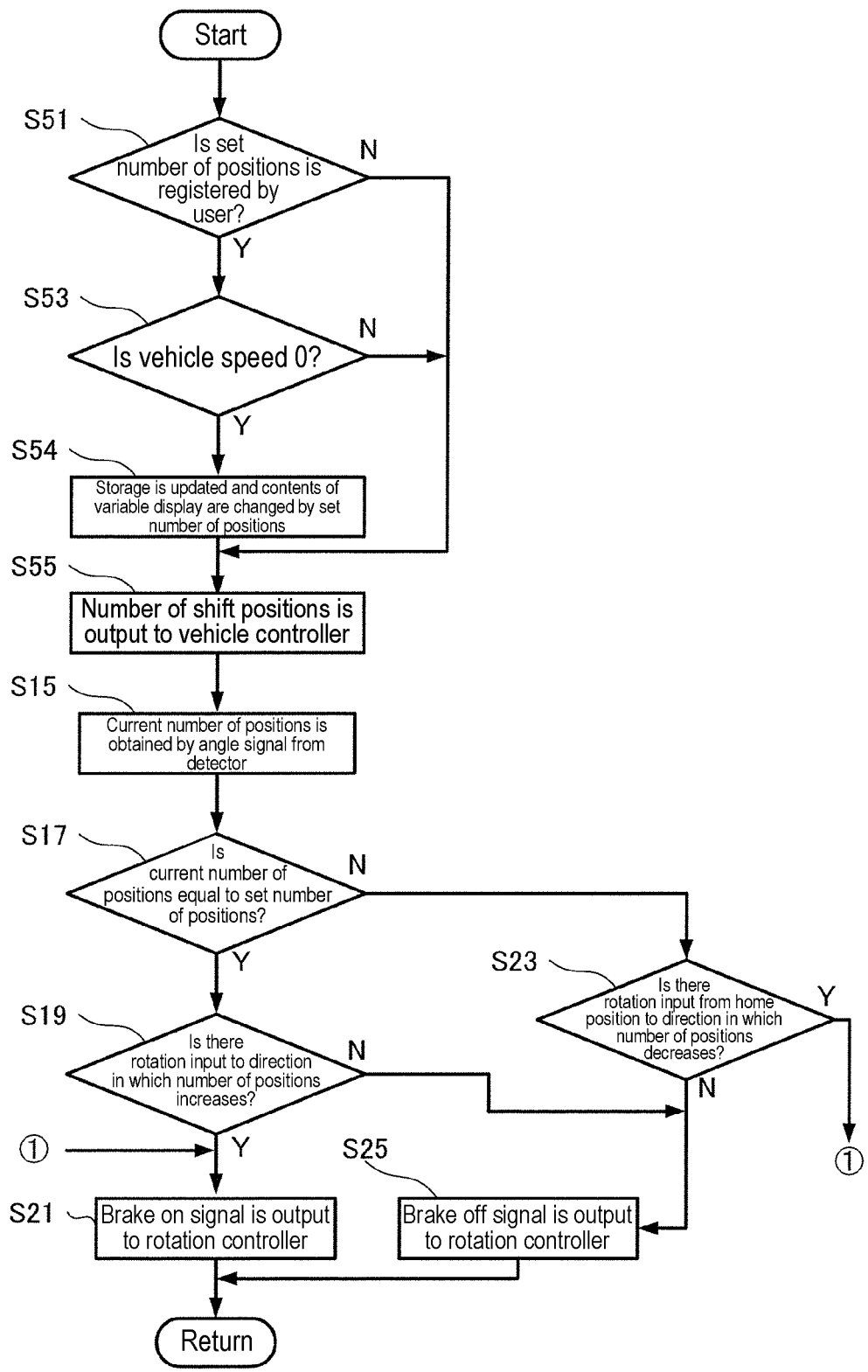
FIG. 17 is a flowchart illustrating a flow of processing of the input device according to Exemplary Embodiment 3.

FIG. 17 is a flowchart illustrating a flow of processing of the input device according to Exemplary Embodiment 3.

As illustrated in FIG. 17, the maximum number of the positions is registered in input device 100 using position number setter 201 from a user such as a driver (S51: Y), and when a running state of a vehicle which is obtained by vehicle controller 202 is a vehicle speed of 0 (S53: Y), controller 200 updates the number of the positions stored in storage 210 and changes a content of the variable display according to the position number signal output from position number setter 201 (S54).

For example, as illustrated in an upper left in FIG. 16, if the maximum number of the positions stored in storage 210 is 5 and a user sets the number of the positions to 7 using position number setter 201, controller 200 updates the number of the positions stored in storage 210 from 5 to 7, and as illustrated in a lower right in FIG. 16, changes the display so that first variable display 131 becomes "3", second variable display 132 becomes "2", and third variable display 133 becomes "L". Fourth variable display 134 is kept blank. That is, the display of fourth variable display 134 corresponding to a position in which the rotational operation of knob 101 is prohibited is in a state of being deleted.

Patterns according to the number of the positions capable of updating are stored in storage 210. Therefore, mark 111 is in the position of L, that is, the current number of the positions becomes the number 7 of the positions stored in the storage, and in a case where a vehicle runs at a low speed, when a user further rotates knob 101 to the right, controller 200 outputs the brake ON signal to rotation controller 105 according to the read pattern (S21) and brake is applied to the rotation of knob 101. On the other hand, when knob 101 is rotated to the left, it is possible to rotate knob 101 by a force depending on the rotational operation force according to a pattern corresponding to the vehicle speed (S25).

In a case where there is the rotation input from the home position in which mark 111 is in the position of P in a direction in which the number of the positions decreases (S23: Y), controller 200 outputs of the brake ON signal to rotation controller 105 (S21). On the other hand, in a case where knob 101 is rotated from the position of P to the right, it is possible to rotate knob 101 depending on the rotational operation force according to a pattern corresponding to the vehicle speed (S25).

In input device 100 according to Exemplary Embodiment 3, it is possible to make input device 100 in which a user can arbitrary change the number of the positions and it is possible to flexibly correspond to the request of the user. The display of display 103, particularly, the variable display corresponding to the number of the positions that is set by a user is changed. Therefore, it is possible to reliably recognize the region in which the rotation of knob 101 is prohibited by the user.

The disclosure is not limited to the exemplary embodiments described above. For example, an exemplary embodiment realized by arbitrary combining the configuration elements described in this specification and excluding some of the configuration elements may be an exemplary embodiment of the disclosure. The disclosure also includes modification examples obtained by executing various modification that can occur to those skilled in the art with respect to the exemplary embodiments described above without departing from the gist of the disclosure, that is, the meanings indicated by the words described in the claims.

For example, in the exemplary embodiments described above, the input device is described as including operation force imparting unit 107, but these may not be particularly provided.

As an application example of input device 100, an example of changing the gear position of the vehicle is exemplified, but it may be used for an input of a car navigation system or a car audio. In this case, the number of the positions may be updated only when the vehicle speed is 0. It can be applied to arbitrary device such as input device 100 for operating an electric apparatus such as televisions and air conditioners.

Although electromagnetic type rotation controller 105 that is disposed on a side of the outer peripheral surface of rotation shaft body 102 is exemplified, the type and the mounting position of electromagnetic type rotation controller 105 are arbitrary.

In a case where a vehicle is not in the driving mode, knob 101 may be freely rotated without causing the rotation control unit or the operation force imparting unit to function. For example, this makes it possible to adjust an air amount of an air conditioner or the like, and to adjust a sound amount of an audio.

This disclosure can be used for an apparatus controlled by a rotational operation such as a vehicle or an electric apparatus.

What is claimed is:
1. An input device comprising:
a knob that is operated to be rotated by a hand of a person;
a rotation shaft body that is connected to the knob and rotates together with the knob;
a rotation controller that is capable of changing a rotational operation force around the rotation shaft body or prohibiting a rotational operation;
a detector that detects a rotational position of the rotation shaft body;
a controller that is electrically connected to the rotation controller and the detector; and
a storage, wherein the storage stores a plurality of patterns, each pattern of the plurality of patterns including information that individually defines for each corresponding rotational position, the rotational operation force for when the rotational operation is performed from a predetermined rotational position to an adjacent rotational position, and
wherein the controller reads one pattern of the plurality of patterns from the storage according to a pattern signal input from an outside of the input device, and controls the rotation controller according to the rotational position detected by the detector and the read pattern when the knob is operated to be rotated, and changing the rotational operation force.

2. The input device of claim 1, further comprising:
an operation force imparting unit that generates an operational force for each predetermined angle of the knob.

3. The input device of claim 1, wherein the controller converts the rotational position that is detected by the detector into a gear position selected in a transmission of a vehicle, and outputs the rotational position.

4. The input device of claim 3, wherein each pattern of the plurality of patterns corresponds to a shift pattern of the transmission.

5. The input device of claim 1, wherein the pattern signal is a vehicle speed signal of a vehicle.

6. The input device of claim 1, further comprising:
a position number setter that inputs a position number signal according to a number of positions using a user interface, and outputs the position number signal to the controller,
wherein the storage stores the number of positions when the rotation of the knob is in a stably stopped state by an operation force imparting unit in the rotational operation of the knob and the patterns according to the number of the positions, and
wherein the controller updates the number of the positions that is stored in the storage according to the position number signal output from the position number setter and controls the rotation controller so as to prohibit the rotation around the rotation shaft body when the rotational position detected by the detector is operated to be rotated so as to exceed a range of the updated number of the positions.

7. The input device of claim 6, further comprising:
a display that is electrically connected to the controller and is disposed at a position corresponding to the rotational operation of the knob,
wherein, when the number of the positions is updated, the controller causes a position at which the rotational operation is able to be performed to display in the display and the display of the position at which the rotational operation is prohibited to erase in the display.

8. The input device of claim 6, wherein the controller converts the rotational position that is detected by the detector into a gear position that is selected in a transmission of a vehicle and outputs the rotational position, and updates the number of the positions when the vehicle is stopped.

* * * * *